United States Patent
Ćefo (12)

(10) Patent No.: US 6,291,901 B1
(45) Date of Patent: Sep. 18, 2001

(54) ELECTRICAL POWER GENERATING TIRE SYSTEM

(76) Inventor: Nevres Ćefo, P.O. Box 42279, Brookpark, OH (US) 44142

( * ) Notice: Subject to any disclaimer, the term of this patent is extended or adjusted under 35 U.S.C. 154(b) by 0 days.

(21) Appl. No.: 09/592,800

(22) Filed: Jun. 13, 2000

(51) Int. Cl.[7] ...................................... M02P 9/04
(52) U.S. Cl. ........................ 290/1 R; 310/15; 310/75 C; 322/3
(58) Field of Search .................. 290/1 R; 310/15, 310/13, 14, 75 C, 36; 322/3

(56) References Cited

U.S. PATENT DOCUMENTS

| | | | |
|---|---|---|---|
| 3,696,251 | * 10/1972 | Last et al. | 290/53 |
| 3,699,367 | 10/1972 | Thomas | 310/69 |
| 3,760,351 | 9/1973 | Thomas | 340/443 |
| 3,885,163 | * 5/1975 | Toberman | 290/1 R |
| 3,895,244 | * 7/1975 | Link | 310/15 |
| 4,061,200 | 12/1977 | Thompson | 180/165 |
| 4,220,907 | 9/1980 | Pappas et al. | 322/3 |
| 4,405,872 | 9/1983 | Thomas | 310/75 R |
| 4,429,232 | 1/1984 | Thomas et al. | 290/1 R |
| 4,504,761 | 3/1985 | Triplett | 310/39 |
| 4,782,256 | * 11/1988 | Kokubu | 310/83 |
| 4,827,163 | * 5/1989 | Bhate et al. | 310/15 |
| 4,893,877 | * 1/1990 | Powell et al. | 310/67 A |
| 5,347,186 | * 9/1994 | Konotchik | 310/17 |
| 5,631,507 | * 5/1997 | Bajric et al. | 310/67 A |
| 5,696,413 | * 12/1997 | Woodbridge et al. | 310/15 |
| 5,818,132 | * 10/1998 | Konotchik | 310/17 |

FOREIGN PATENT DOCUMENTS

2436224A * 2/1975 (DE).

* cited by examiner

Primary Examiner—Joseph Waks
(74) Attorney, Agent, or Firm—Calfee, Halter & Griswold LLP

(57) ABSTRACT

A method and device for generating electrical energy from the rotation of a wheel of a vehicle is disclosed. The device is disposed within a pneumatic tire and includes a coil housing having an interior chamber with a coil disposed thereabout, which is aligned for receiving a magnet within the chamber. The magnet is mounted within a magnet housing which has a first end aligned for reception in the groove of the coil housing, and a second end in communication with the interior wall of a tire. As the tire rotates, the tire deflection causes relative motion between the magnet and the coil generating electricity.

7 Claims, 4 Drawing Sheets

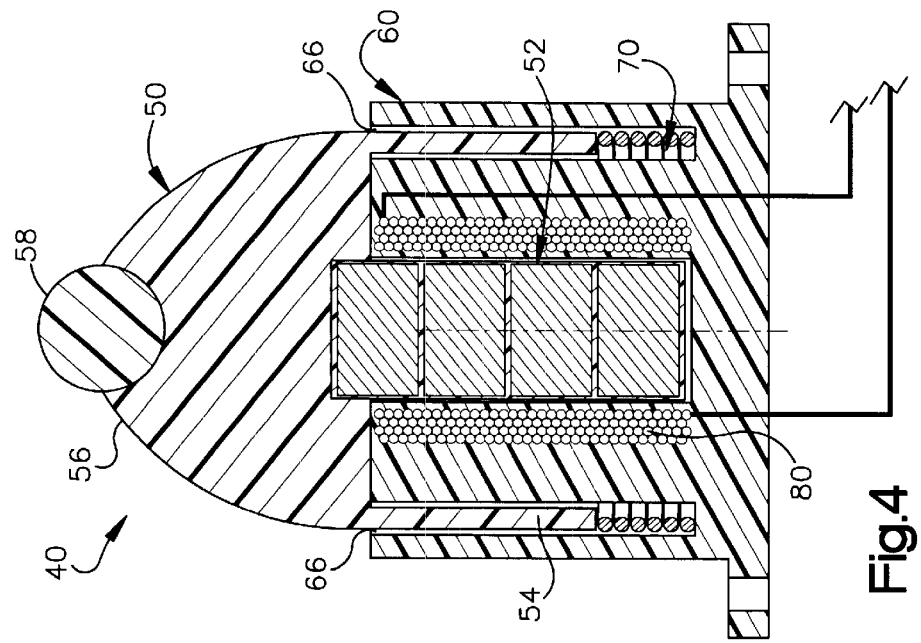
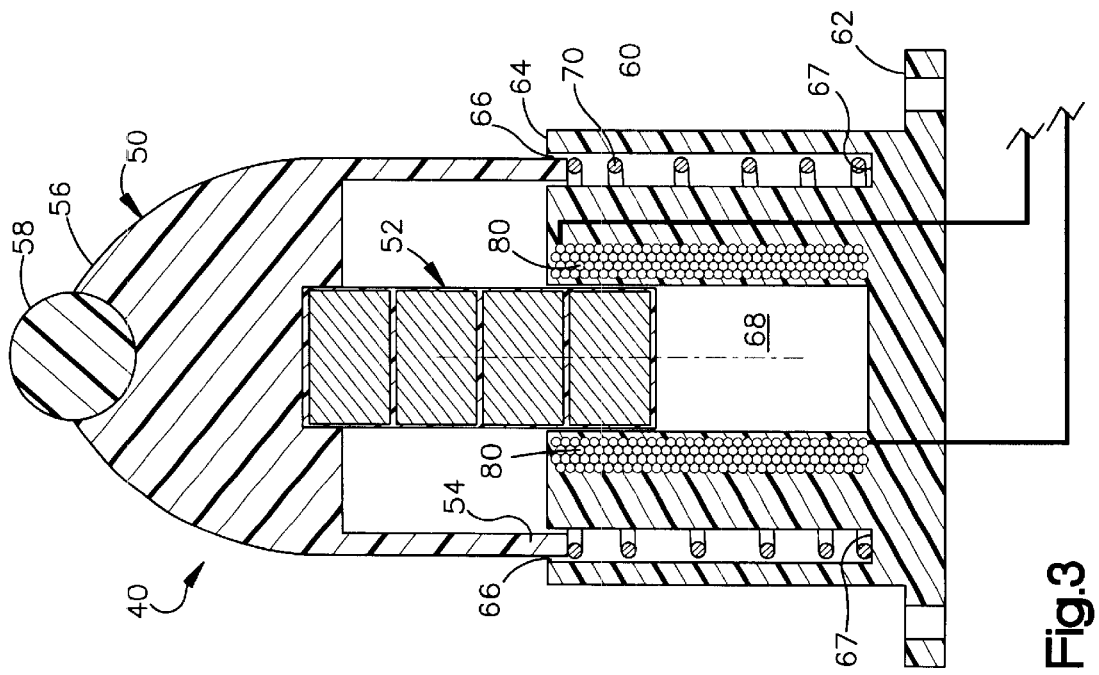

ELECTRICAL POWER GENERATING TIRE SYSTEM

FIELD OF THE INVENTION

This invention generally relates to power generation and more specifically to a vehicular energy generation system.

BACKGROUND OF THE INVENTION

Much of the energy used to power vehicles does not go towards moving the vehicle forward, but is instead dissipated to the surrounding environment. One area of energy loss is through the repeated deformation or radial flexure of the tires of the vehicle due to the weight of the vehicle. If the lost energy can be reclaimed, the recaptured energy may be used to propel the vehicle or be utilized to power auxiliary components.

Several methods have been proposed to recapture the lost energy from the deformation of vehicle tires. For example, one method as described in U.S. Pat. No. 4,061,200 to Thompson teaches using the output of a fluid motor to turn an electrical generator. A bellows pump assembly, which is mounted to vehicle's wheel rim and is compressed upon each revolution of the tire, pumps pressurized fluid that actuates the fluid motor. This system has the drawback associated with using fluid such as the potential for leaks, the use of valves which periodically fail, and the need to use fluids which maintain properties of compressibility and viscosity under extreme environmental conditions.

Another prior art approach to generating electric power is shown in U.S. Pat. No. 3,699,367 to Thomas, which uses a mechanical plunger actuated by the deforming tire to generate electrical power. One major disadvantage to this design is that a complex mechanical structure is requires which does not generate continuous electrical power. Further, the amount of power generated is not sufficient to recharge a battery.

Another approach to generating electrical power from tire deformation utilizes an iron core wrapped by a coil as described in U.S. Pat. No. 4,220,907 to Pappas. A magnet is normally in contact with one end of the core, but is pulled apart during deformation of the tire to create electromotive force within the coil. One drawback of this system involves the contact between the magnet and core which will cause wear and with repeated cycling, possibly leading to potential failure. Another disadvantage to this system design is that it is mechanically complex and only a small electromagnetic force will be produced. In addition, the system produces an asymmetrical voltage output.

Thus a simple, inexpensive system, which generates electricity on a continuous basis from tire deformation and which is mechanically simple, is desired.

SUMMARY OF THE INVENTION

The invention provides in one aspect an electrical power generating device for generating electricity from the deflection of a tire. The device comprises a coil housing having a first end for mounting to a hub of a wheel, and an interior chamber with an electrically conductive coil disposed about said chamber. The device further includes a magnet housing having a first end for mating engagement with said coil housing and a second end for engagement with an interior wall of a tire. The magnet housing further comprises a magnet assembly aligned for reception within the interior chamber of the coil housing whereby the deflection of the tire directs the magnet housing radially inward so that the magnet assembly moves relative to the coils disposed within the chamber resulting in electricity being generated. Thus, the deflection of the tire directs the magnet housing radially inward so that the magnet assembly moves relative to the coils disposed within the chamber resulting in electricity being generated.

In another aspect of the invention, the invention provides a method for generating electrical energy comprising the steps of mounting a coil housing to the hub of a wheel of a vehicle. The coil housing has an interior chamber with a coil disposed about the chamber. Next, a magnet housing is disposed within the coil housing. The magnet housing has a permanent magnet mounted therein which is aligned for reception within the chamber of the coil housing. A distal end of the magnet housing is in communication with an interior wall of the tire. Next, the wheel of the vehicle is rotated whereby deforming the tire results in relative movement between the magnet assembly and the coil so that electricity is generated.

BRIEF DESCRIPTION OF THE FIGURES

FIG. 3 is a cross-sectional view of a magnetoelectric generator shown with the spring in an extended position;

FIG. 4 is a cross-sectional view of the magnetoelectric generator shown with the spring in a retracted position.

DETAILED DESCRIPTION OF PREFERRED AND ALTERNATE EMBODIMENTS

Figure 1:
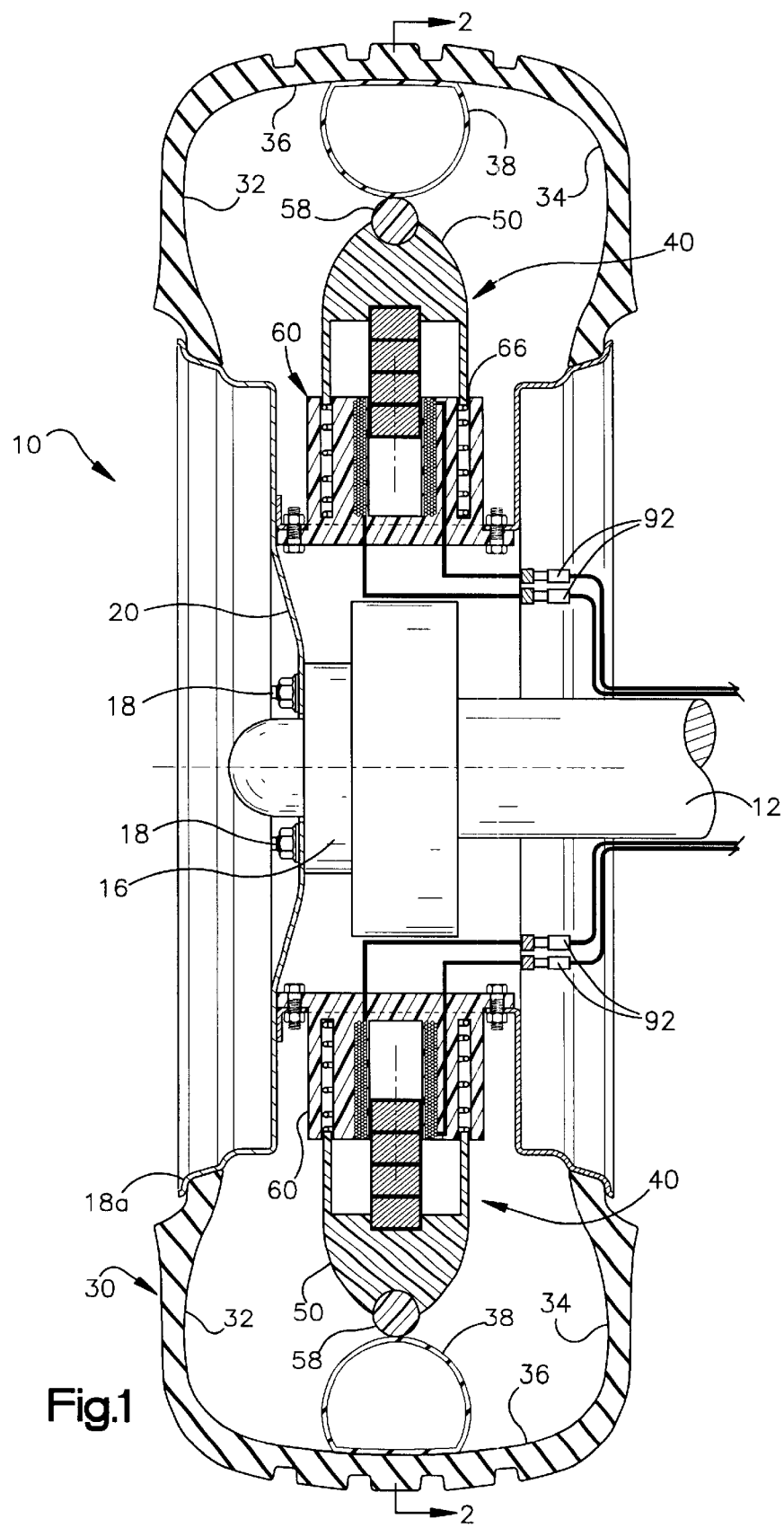
FIG. 1 is a cross-sectional view of a wheel assembly of the present invention.

Referring to the drawings, FIG. 1 illustrates a wheel assembly 10 of a power generating system according to the invention. The power generating system, as described in more detail below, provides a method and device for converting non-utilized or previously wasted mechanical energy from the deflection of a tire of a vehicle into electrical power. The electrical power may be used for example, to power auxiliary systems or be used as a secondary source of propulsion power, such as source of battery power for a battery-powered car.

Figure 2:
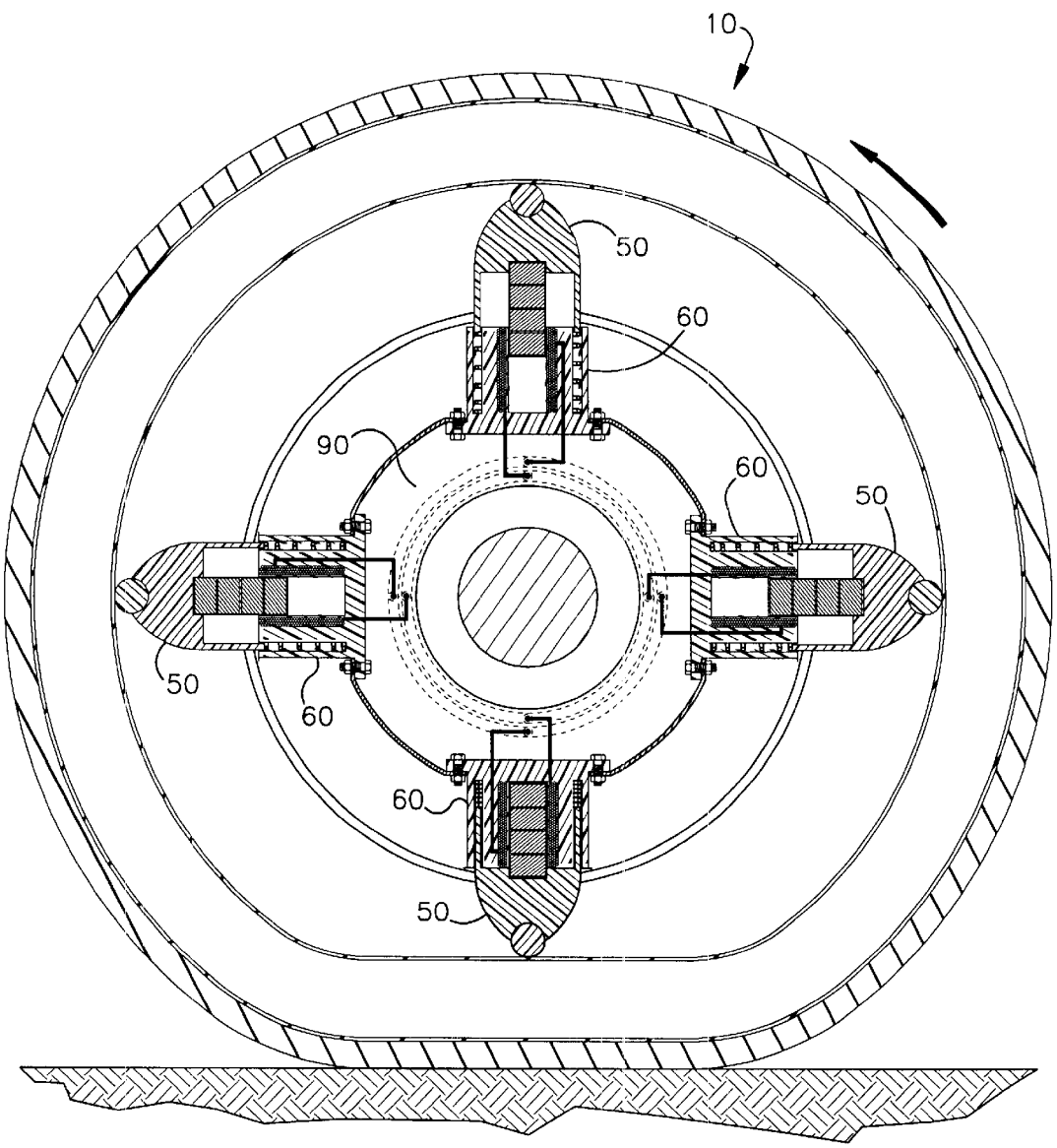
FIG. 2 is a view in the direction 2—2 of the wheel assembly as shown in FIG. 1.
Figure 5:
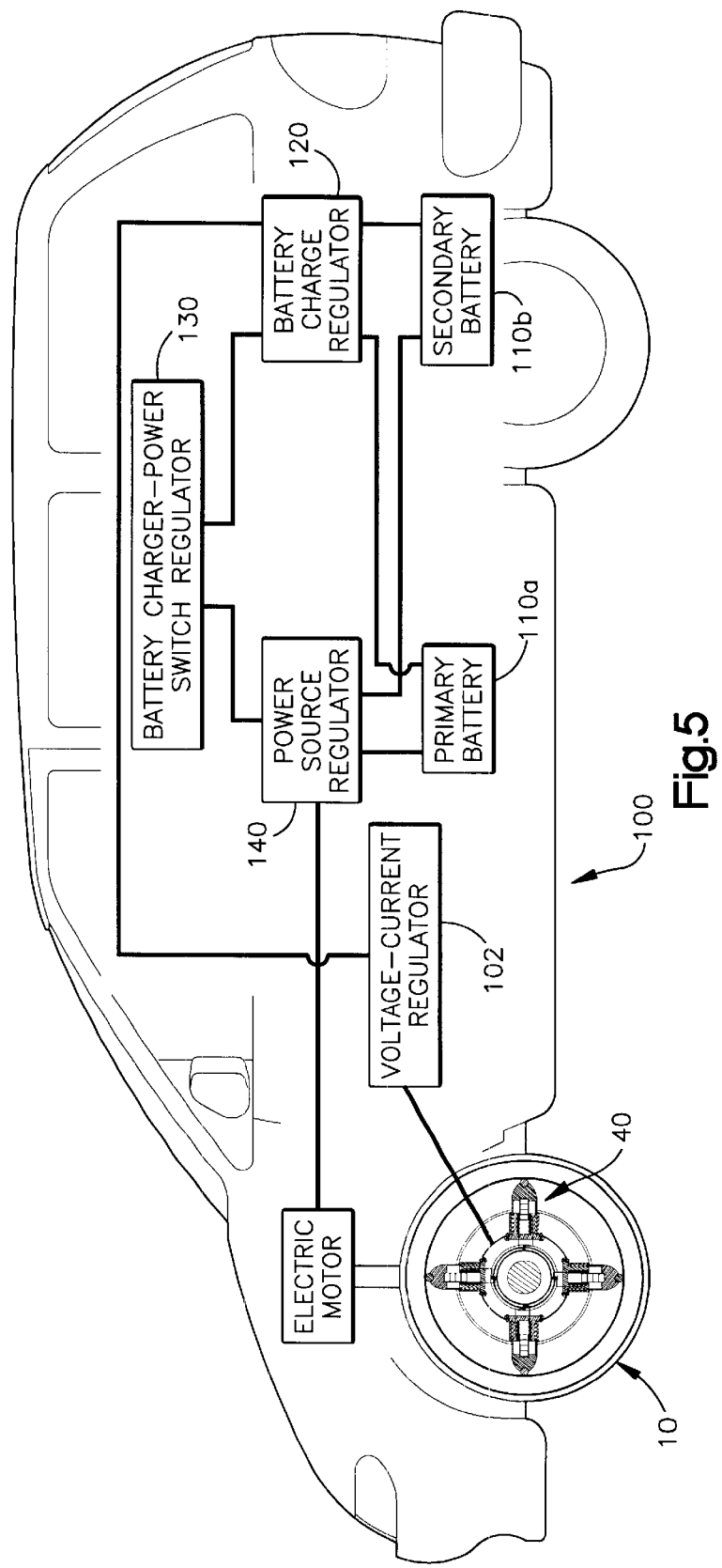
FIG. 5 is a schematic of a vehicle having a wheel assembly of the present invention and a battery charging system.

As shown in FIG. 2, the wheel assembly 10 is shown mounted on the axle assembly 12 of a suitable vehicle (not shown), such as an automobile. However, the invention may be used in conjunction with any type of vehicle having one or more wheels and a main power system. The details of construction of the vehicle are not illustrated in the drawings since it is well known in the art how to construct a vehicle. The wheel assembly 10 is rotatably mounted to the axle shaft 12 via mounting flanges 16 and bolts 18. The wheel assembly 10 comprises a hub 20 secured to the flange 16, and a tire mounting rim 18A secured to the hub 20. A conventional tubeless tire 30 is mounted on the rim 18A of the wheel 10 and is inflated with air or other suitable fluid to provide rolling support for the vehicle weight bearing down on the axle assembly and wheel assembly of the vehicle. The tire 30 further comprises inner and outer sidewalls 32,34 joined by an end wall 36 having an exterior tire tread for contacting the road surface. The interior portion of the sidewalls 32,34 form a bead which forms a seal with the rim 18A. The tire may be comprised of conventional materials such as rubber or any other suitable material.

The tire 30 is preferably formed with a circumferential radial protrusion 38 which extends or projects from the exterior wall 36 preferably forming a bulbous cross-sectional shape. The protrusion 38 may be hollow, filled with air or other solid material. It is preferred that the protrusion be filled with a resilient material. The protrusion 38 acts as a vertical pressure coupling which functions to direct the normal forces of the wheel into radial alignment with the longitudinal axis of the magnetoelectric generator. The protrusion 38 also act as a shock absorber to prevent damage to the magnetoelectric generator when the wheel undergoes jarring action due to severe road conditions. Alternatively, the protrusion may comprise a contiguous ridge formed of a compressible material which radially extends along the entire circumference of the wall 36. Preferably, the protrusion 38 is formed from a compressible, yet resilient, material such as a polymeric material, rubber compound or elastomer material.

As shown in FIG. 2, the wheel assembly 10 further includes one or more magnetoelectric generators 40 which convert tire flexure energy into electrical power as described in more detail, below. The magnetoelectric generator 40 comprises a magnet housing 50 and a coil housing 60 comprised of non-magnetic material. The coil housing 60 has a proximal flanged end 62 which is radially mounted to the hub portion of the wheel through circumferentially spaced holes by conventional means, such as threaded fasteners. The coil housing 60 additionally comprises a distal end 64 having a groove 66 for receiving a first end 52 of the magnet housing 50. Contained within the groove 66 is a spring 70 which has a first end aligned for engagement with the bottom wall 67 of the groove, and a second end in engagement with the first end of the magnet housing 50. The coil housing 60 further comprises an interior hole or channel 68 which is aligned for receiving a magnet assembly 52 mounted within the magnet housing 50, therein. The magnet assembly 52 may be comprised of a plurality of aligned magnets. Embedded within the coil housing 60 is a coil 80 comprised of electrically conductive material such as copper, aluminum or silver, and which is wound about the channel 68 for electrical communication with the magnet 52.

The magnet housing 50 is preferably cylindrical in shape and preferably comprises a first annular end 54 aligned for being in sliding engagement within the annular groove 66 of the coil housing 60. The magnet 52 is mounted within or to the interior of the magnet housing 50 and is aligned for sliding engagement with the hole or channel 68 of the coil housing 60. The second or distal end 56 of the magnet housing 50 preferably comprises a rounded end having a ball or roller 58 rotatably mounted therein by known conventional means. The roller 58 is aligned for mating engagement with the interior wall 36 of the tire or the protrusion surface 38, and preferably comprises a wear resistant material such as steel.

The respective ends of coil 80 are each connected to two or more slip rings 90 so that the generated electricity may be transferred to a charging system 1000. The slip rings 90 are mounted to the wheel assembly 10 and are in continuous contact with contact brushes 92 mounted on a vehicle. The contact brushes 92 are connected to a voltage/current regulator 102 of the charging system 100 using electrically conductive wire as shown in FIG. 2. Thus the wheel assembly 10 may be easily installed or removed from the vehicle without the need to make or break numerous electrical attachments when the slip rings 90 and brush assembly 92 are used. Alternatively any system known to those skilled in the art which allows the transfer of electricity from a rotating object to a stationary object may be used.

Preferably, the voltage/current regulator 102 is used to transform electricity from the coil 80 into a form suitable for charging one or more batteries 110a,b. However, the generated electricity may be also used for other purposes such as powering accessories or operating electrical heat generators. Typically, coil 80 produces pulsing current and voltage, while direct or direct pulse current and voltage is often necessary to charge batteries 110a,b. The voltage/current regulator 102 is connected to a battery charge regulator 120 using electrically conductive wire. The battery charge regulator 120 functions to direct electricity to or away from one or more batteries 110a,b and monitor the state of charging of individual batteries 110a,b. When multiple batteries 110a,b are in use, a battery charger-power switch 130 is used to control the battery charge regulator 120 thus determining which battery 110a,b receives electricity to charge it. The battery charge regulator 120 is connected to one or more batteries 110a,b. Batteries 110a,b are in turn connected to a power source regulator 140. The power source regulator 140 functions to direct electricity from one or more batteries 110a,b to a device which is driven by electricity. When multiple batteries 110a,b are in use, the battery charger-power switch 130 is also used to control the power source regulator 140. When one battery 110a,ba is charging, a different battery 110a,bb is supplying power to the electrically driven device such an electric motor. The battery charge regulator 120, battery charger-power switch 130, and power source regulator 140 are preferably programmable logic controllers (PLCs), but may also be microprocessors, simple relays, or power electronics.

The operation of the wheel assembly 10 and the charging system may now be described. When the vehicle is in motion, the wheel assembly 10 rotates continuously, with only a portion of the wheel assembly being in contact with the ground. With each revolution of the wheel, the magnetoelectrical generator 40 is brought into alignment with the maximum tire deflection. Thus a portion of the surface area of the tire is deformed. As the tire i s deformed, the inner protrusion 38 or inner tire end wall 36 exerts a radially inward force onto the coupling 58 of the magnetoelectrical generator 40. The radially inward force pushes the distal end 54 of the magnet housing 50 into the aligned groove 66 of the coil housing 60, thus overcoming the resistance of the spring 70 contained within the groove 66. As the magnet housing 50 engages the coil housing 60, the magnet assembly 52 is inserted into the chamber 68 of the coil housing 60 resulting in electricity being generated from the motion of the magnet 52 within the coil 80. Electricity from the coil 80 travels through the slip ring assembly 90 to the brushes 92 and then to the charging system 100. The charging system 100 transforms electricity into a form suitable for charging batteries or for other purposes such as powering accessories like a radio, lights or gauges. The electricity passes through the battery charge regulator 120 where it is directed to a battery 110a,b to be charged.

As the wheel assembly continues to rotate so that the deformed area of the tire loses contact with the road, the springs within the coil housing, as well as the centrifugal force of the rotating tire, push the magnet housing 50 radially outward so that the magnet 52 disengages from the channel 68 of the coil housing. Electricity is generated Luring the recoil of the magnet assembly through the coil. The process is repeated upon the next revolution of the wheel assembly. A plurality of magnetoelectric generators may be mounted upon a wheel assembly to generate a continuous source of electricity. In addition, additional wheels of the vehicle may be equipped with the magnetoelectric generators.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

I claim:

1. An electrical power generating device for generating electricity from a deflection of a tire, the device comprising:

a coil housing having a first end for mounting to a hub of a wheel, and an interior chamber with a electrically conductive coil disposed about said chamber;

a magnet housing having a first end for mating engagement with said coil housing and a second end for engagement with an interior wall of said tire;

said magnet housing further comprising a magnet assembly aligned for reception within the interior chamber of the coil housing so that the deflection of the tire directs the magnet housing radially inward so that the magnet assembly moves relative to the coils disposed within the chamber resulting in electricity being generated.

2. The device of claim 1 wherein the coil housing further comprises a second end having a groove and a spring is disposed within the groove which normally biases the magnet assembly away from said coil housing.

3. The device of claim 1 wherein the first end of the magnet housing is annular and aligned for reception within a groove of said coil housing.

4. An electrical power generating device for generating electricity from a deflection of a tire, the device comprising:

a coil housing having a first end for mounting to a hub of a wheel, and an interior chamber with a electrically conductive coil disposed about said chamber;

a magnet housing having a first end for mating engagement with said coil housing and a second end further comprising a roller for engagement with an interior wall of said tire;

said magnet housing further comprising a magnet assembly aligned for reception within the interior chamber of the coil housing so that the deflection of the tire directs the magnet housing radially inward so that the magnet assembly moves relative to the coils disposed within the chamber resulting in electricity being generated.

5. An electrical power generating device for generating electricity from a deflection of a tire, the device comprising:

a coil housing having a first end for mounting to a hub of a wheel, and an interior chamber with a electrically conductive coil disposed about said chamber;

a magnet housing having a first end for mating engagement with said coil housing and a second end for engagement with an interior wall of said tire, wherein said tire further comprises an inner protrusion;

said magnet housing further comprising a magnet assembly aligned for reception within the interior chamber of the coil housing so that the deflection of the tire directs the magnet housing radially inward so that the magnet assembly moves relative to the coils disposed within the chamber resulting in electricity being generated.

6. A method for generating electrical energy comprising:

mounting a coil housing to the hub of a wheel of a vehicle, said coil housing having an interior chamber with a coil disposed about said chamber;

disposing a magnet housing having a permanent magnet mounted therein and aligned for engagement within the chamber of the coil housing, and a distal end in communication with an interior wall of the tire; and rotating the wheel so that deforming the tire results in relative movement between the magnet assembly and the coil so that electricity is generated.

7. An electrical power generating device for generating electricity from a deflection of a tire, the device comprising:

a coil housing having a first end for mounting to a hub of a wheel, and an interior chamber with a electrically conductive coil disposed about said chamber;

a magnet housing having a first end for mating engagement with said coil housing and a second end for engagement with an interior wall of said tires;

said magnet housing further comprising a magnet assembly aligned for reception within the interior chamber of the coil housing so that the deflection of the tire directs the magnet housing radially inward so that the magnet assembly moves relative to the coils disposed within the chamber resulting in electricity being generated; and said magnet and said magnet housing being mounted so that they rotate with said wheel.

* * * * *